United States Patent [19]

Kitamura

[11] 4,182,485

[45] Jan. 8, 1980

[54] THERMALLY RESPONSIVE VALVE

[75] Inventor: Kazuhiko Kitamura, Toyota, Japan

[73] Assignee: Aisin Seiki Kabushiki Kaisha, Aichi, Japan

[21] Appl. No.: 926,383

[22] Filed: Jul. 20, 1978

[30] Foreign Application Priority Data

Jul. 26, 1977 [JP] Japan .............................. 52-99556[U]

[51] Int. Cl.² .......................................... G05D 23/10
[52] U.S. Cl. ............................... 236/48 R; 137/637.2; 137/882; 236/101 C
[58] Field of Search ................... 236/48 R, 87, 101 C; 123/117 A; 137/637.2, 882

[56] References Cited

U.S. PATENT DOCUMENTS

| | | | |
|---|---|---|---|
| 1,063,334 | 6/1913 | Donnelly | 137/637.2 X |
| 1,360,431 | 11/1920 | Molas | 137/637.2 X |
| 4,076,172 | 2/1978 | Inada et al. | 236/48 R |
| 4,117,976 | 10/1978 | Doherty, Jr. | 236/48 R |
| 4,140,275 | 2/1979 | Inada | 123/117 A X |

*Primary Examiner*—William F. O'Dea
*Assistant Examiner*—William E. Tapolcai, Jr.
*Attorney, Agent, or Firm*—Oblon, Fisher, Spivak, McClelland & Maier

[57] ABSTRACT

A thermally responsive valve device comprises a body member having an inlet port and two outlet ports, a first passage connecting the inlet port and one of the outlet ports, a second passage communicating with the other of the outlet ports, a first valve seat positioned in the first passage, a first valve member movable into and out of engagement with the valve seat, a penetrating passage being provided through the first valve member and connecting the second passage and the inlet port, a second valve seat formed on the first valve member, a second valve member movable into and out of engagement with the second valve seat, first and second bimetal disks movable in response to variations in temperature. The first and second bimetal disks operating the first and second valve members to close and open the first passage and the penetrating passage respectively.

4 Claims, 3 Drawing Figures

THERMALLY RESPONSIVE VALVE

BACKGROUND OF THE INVENTION

1. Field of the Invention

This invention relates to thermally responsive valve devices, and more particularly to a thermally responsive valve device having dual operating valve function which closes and and opens two passages, respectively.

2. Description of the Prior Art

Various thermally responsive valve devices of this type have been used in emission control systems of automobiles. For example, a valve device of the wax operating type has been previously proposed. However, wax operating valves are commonly subject to a loss of wax when subjected to overpressures, and such loss of wax tends to change the operating temperatures of the valve. Wax operating valves have a complicated structure and a relatively high production cost. On the other hand, a valve device of the bimetal operating type has also been proposed. However, since the bimetal operating valve device needs two valve members positioned in the two passages and respective valve seats, the valve device is complicated in structure and high in cost.

SUMMARY OF THE INVENTION

It is an object of this invention to provide a thermally responsive valve device having a dual operating valve function which closes and opens two passages. It is another object of this invention to provide a thermally responsive valve device employing two bimetal disks to be actuable at different predetermined temperature levels. It is a further object of this invention to provide a thermally responsive valve device which is compact in construction, low in cost, and reliable in operation. It is yet another object of this invention to provide a thermally responsive valve device which eliminates the conventional defects.

BRIEF DESCRIPTION OF THE DRAWINGS

Various other objects of this invention will become apparent from the following detailed description when considered in connection with the accompanying drawings in which.

DETAILED DESCRIPTION OF THE PREFERRED EMBODIMENT

Figure 1:
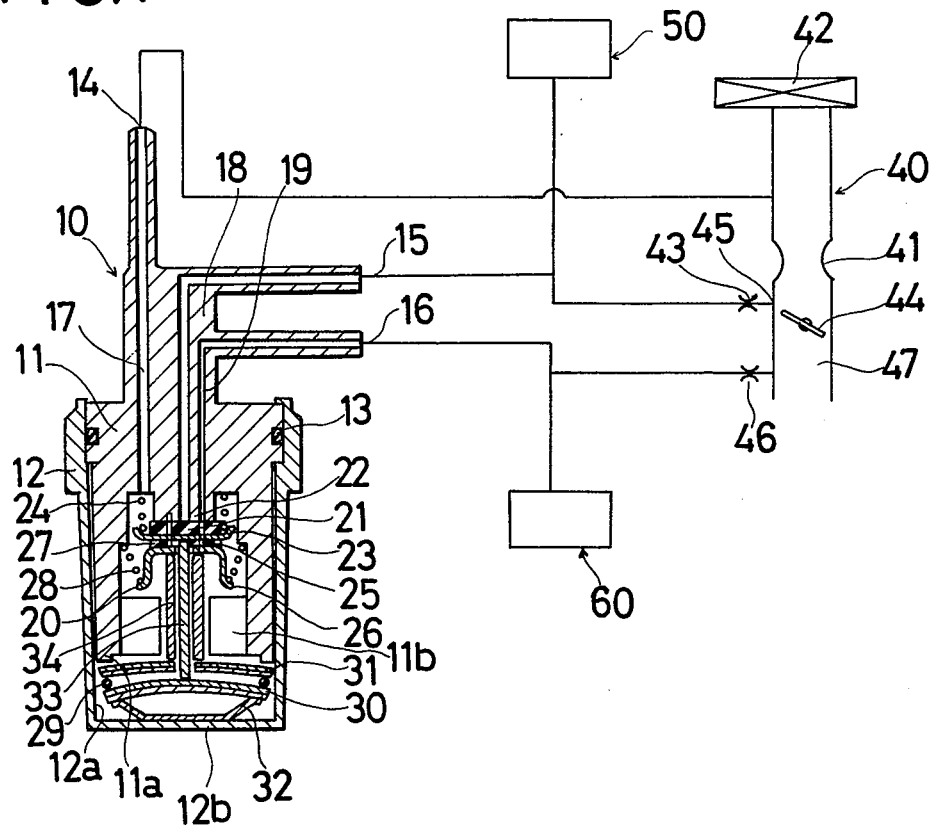
FIG. 1 is a vertical sectional view of a thermally responsive valve device, in accordance with this invention, incorporated in an emission gas control system of an internal combustion engine.

Referring now to the drawings, a thermally responsive valve device 10 of this invention includes a first body member 11 and a second body member 12, which are sealingly combined with each other by a suitable connecting means. A sealing O-ring or gasket 13 is disposed between the first and the second body members 11 and 12. The first body member 11 has an inlet port 14, a first outlet port 15, and a second outlet port 16. The inlet port 14 is connected to an atmospheric source, such as the portion between a venturi section 41 of a carburetor 40 and an air cleaner 42.

A first vacuum responsive device 50 is connected through an orifice member 43 to a vacuum advance port 45 provided at a point just above the idle position of throttle valve 44. A second vacuum responsive device 60 is connected through an orifice member 46 to an engine intake manifold 47.

The first and second outlet ports 15 and 16 of the thermally responsive valve device 10 are connected to the first and second vacuum responsive devices 50 and 60, respectively. The first body member 11 is provided with a first passage 17, a second passage 18, and a third passage 19 communicating with the inlet port 14, the first outlet port 15, and the second outlet port 16, respectively. The second body member 12 is made of a thermally conductive metal material, and is positioned in the water jacket adapted to cool the engine, thereby transferring the changes in coolant temperature within the water jacket to the bimetal disks discussed below.

Formed inside the first body member 11 is an operating chamber 20 communicating with the atmospheric source through the first passage 17 and the inlet port 14. A first valve member 21, which is made of rubber, is located in the operating chamber 20 so as to be movable into and out of engagement with a first valve seat 22 selectively formed on the second passage 18, thereby controlling the fluid communication between the second passage 18 and the operating chamber 20. Interposed between the first body member 11 and a plate 23 fixed in the valve member 21, is a coil spring 24 biasing the valve member 21 downwardly. The first valve member 21 is provided with a penetrating passage 25 therethrough, communicating with the third passage 19 when the first valve member 21 engages with the first valve seat 22. A second valve member 26 which is cup-shaped in form is located in the operating chamber 20 so as to be movable into and out of engagement with a second valve seat 27 formed on the first valve member 21, thereby controlling the fluid communication between the third passage 19 and the operating chamber 20 through the penetrating passage 25. Located in the operating chamber 20 is a coil spring 28 biasing the second valve member 26 downwardly.

Positioned within a central cavity 12a in the second body member 12 are first and second circular dish-shaped thermostatic bimetal disks 30 and 31 which are responsive to the changes in coolant temperature within the water jacket. The first and second bimetal disks 30 and 31 each have one layer of metal whose thermal coefficient of expansion is low and another layer of metal whose thermal coefficient of expansion is somewhat higher. As a result, the bimetal disks 30 and 31 may move by snap-action to the reverse dish shape at first and second predetermined temperatures, respectively. The metal materials of the two bimetal disks 30 and 31 are chosen such that the two disks perform their snap-action at different temperatures. A ring 29 is inserted between the first and the second bimetal disks 30 and 31, so that the bimetal disks are mutually separated from each other. The first body member 11 has a circular shoulder 11a which extends toward the second bimetal disk 31 and is of a diameter slightly smaller than the plan diameter of the disk 31 so that the outer margins of the disk 31 abut thereagainst as the disk 31 snaps over center. In addition, the first body member 11 has a small diameter portion 11b which serves to maintain proper alignment of a transmitting pin 33 and a transmitting pipe 34 as well as to limit the downward movement of the second valve member 26. Interposed between the first bimetal disk 30 and a flat bottom 12b of the second body member 12 is a wave-shaped annular spring 32 biasing the first and second bimetal disks 30 and 31 upwardly, respectively, so that the transmitting pin 33 and pipe 34 bias the first and second valve members 21 and 26 toward the first and second valve seats 22 and 27, respectively.

As stated previously, the first vacuum responsive device 50 is supplied with the vacuum from the advance port 45, and operates in response to the changes in the vacuum. Similarly, the second vacuum responsive device 60 is supplied with the manifold vacuum from the engine intake manifold 47, and operates in response to the changes in the vacuum. Accordingly, the thermally response valve device 10 of this invention serves to supply the first and second devices 50 and 60 with atmospheric pressure in response to the changes within the coolant temperatures and to control the operations of the first and second devices 50 and 60.

Figure 2:
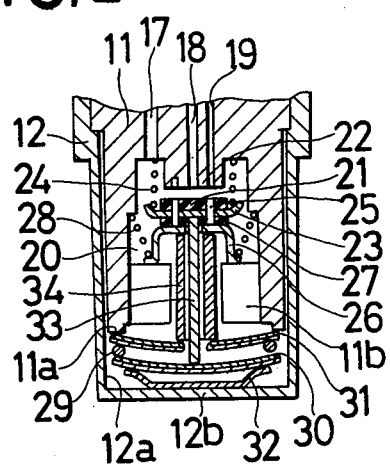
FIG. 2 is a diagrammatic view showing one stage of operation of the valve device of FIG. 1.

When the coolant temperature in the water jacket is below both the first and second predetermined temperature levels, the first and the second bimetal disks 30 and 31 are in a state as shown in FIG. 2. Accordingly, the first valve member 21 is spaced from the first valve seat 22, and the third passage 19 is in communication with the operating chamber 20 although the second valve 26 is in contact with the second valve seat 27. As a result, the atmospheric pressure is transmitted into both the second and the third passages 18 and 19 from the first passage 17, so that both the first and the second devices 50 and 60 are supplied with atmospheric pressure.

Figure 3:
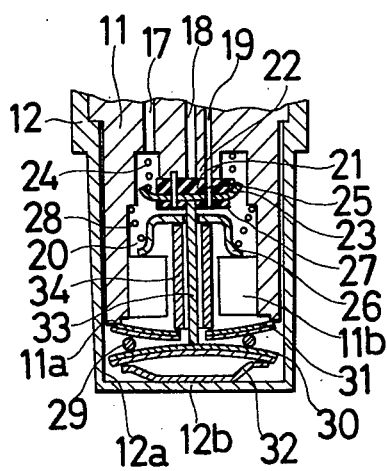
FIG. 3 is a diagrammatic view showing another stage in operation of the valve device in FIG. 1.

When the coolant temperature rises and reaches the first predetermined temperature level, the first valve member 21 moves with snap-action motion to the reverse dish shape as shown in FIG. 3. Accordingly, the first valve member 21 comes in contact with the first valve seat 22, and the second valve member 26 is released from the second valve seat 27. As a result, the second passage 18 is interrupted from communication with the first passage 17, and atmospheric pressure is prevented from being transmitted to the first device 50, so that the first device 50 is supplied with the manifold vacuum from the advance port 45 and begins to operate.

When the coolant temperature rises further and reaches the second predetermined temperature level, the second valve member 26 moves with snap-action motion to the reverse dish shape as shown in FIG. 1. Accordingly, the second valve member 26 comes in contact with the second valve seat 27. As a result, the third passage 19 is interrupted from communication with the first passage 17, and atmospheric pressure is prevented from being transmitted to the second device 60, so that the second device 60 is supplied with the manifold vacuum from the engine intake manifold 47 and begins to operate.

In view of the above, it will be seen that the several objects of the present invention are achieved and other advantageous results attained.

Obviously, numerous modifications and vairations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A thermally responsive valve device comprising a body member having inlet port means and first and second outlet ports therein, first and second passages provided in said body member, said first passage providing communication between said inlet port means and said first outlet port, said second passage communicating with said second outlet port, a first valve seat positioned in said first passage, a first valve member movable into and out of engagement with said first valve seat, a penetrating passage provided through said first valve member, said second passage communicating with said inlet port means through said penetrating passage when said first valve member engages with said first valve seat and directly with said inlet port means when said first valve member is released from said first valve seat, a second valve seat formed on said first valve member, a second valve member movable into and out of engagement with said second valve seat, a first dish-shaped bimetal disk movable with snap-action motion to a reverse disk shape in response to a change in temperature through a first predetermined temperature level thereby operating said first valve member to close and open said first passage, and a second dish-shaped bimetal disk movable with snap-action motion to a reverse disk shape in response to a change in temperature through a second predetermined temperature level thereby operating said second valve member to close and open said penetrating passage.

2. A thermally responsive valve device as set forth in claim 1 further comprising a wave spring positioned between said body member and said first bimetal disk, said wave spring biasing said first and second bimetal disks thereby urging said first and second valve members toward said respective valve seats.

3. A thermally responsive valve device as set forth in claim 2 further comprising a ring inserted between said first and second bimetal disks thereby separating said bimetal disks from each other.

4. A thermally responsive valve device as set forth in claim 2 further comprising spring means biasing said first and second valve members against said respective bimetal disks, and transmitting means to cause said valve members to move into and out of engagement with said respective valve seats in response to movement of said bimetal disks.

* * * * *